Figure 1A:
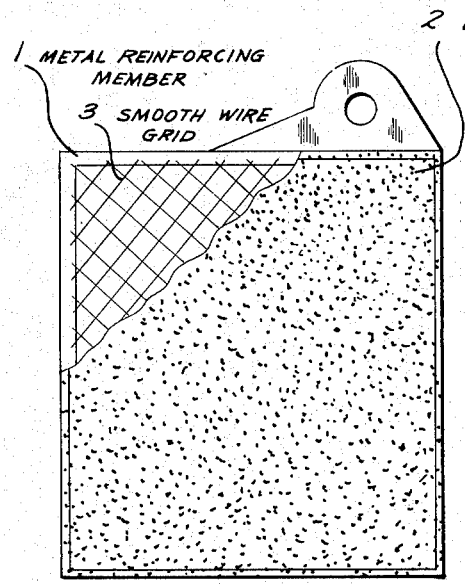

Nov. 22, 1955   P. HAGSPIHL ET AL   2,724,733
ALKALINE STORAGE BATTERY ELECTRODES
Filed Nov. 1, 1952

INVENTORS
Paul Hagspihl
BY Freimut Peters

Michael S. Striker
agt.

United States Patent Office 2,724,733
Patented Nov. 22, 1955

2,724,733

ALKALINE STORAGE BATTERY ELECTRODES

Paul Hagspihl and Freimut Peters, Hagen, Westphalia, Germany

Application November 1, 1952, Serial No. 318,218

Claims priority, application Germany November 9, 1951

17 Claims. (Cl. 136—19)

The present invention relates to alkaline storage battery electrodes and more particularly to electrodes for alkaline storage batteries wherein the sintered porous carrier in which the active electrode material is distributed firmly adheres to the metal reinforcing member on which the sintered porous carrier is supported. Sintered electrodes for alkaline storage batteries usually consist of sintered plates having a metal reinforcing member, in the form of a grid or formed with perforations, which supports a sintered porous carrier into which the active electrode material, nickel hydroxyde in the case of the positive electrode and cadmium, iron or the oxides thereof in the case of the negative electrode, is placed. However, the great difficulty with these electrodes is that the porous carrier body in which the active electrode material is distributed does not remain secured to the suporting member.

More recently it was attempted to cause the sintered porous carrier body to adhere to the metal supporting member by spreading metal supporting member, sintering the powder or paste, which due to the sintering, forms a rough surface on the supporting member, and then electroplating the thus roughened supporting member with an electrochemically non-reactive metal such as nickel, etc. The porous carrier was then entered to the metal supporting member. However, these processes met with failure because the sintered coating of the porous carrier body does not adhere sufficiently well to the metal supporting plate, which is generally perforated, because the roughened surface of said supporting member was made smooth by the electroplating process. The porous carrier body soon works loose, particularly if subjected to heavy vibrations.

It is therefore an object of the present invention to provide a process of forming the sintered electrodes for alkaline storage batteries wherein the highly porous carrier body which serves as carrier for the active electrode mass and in which the active electrode mass is distributed firmly adheres to the metal supporting member.

It is another object of the present invention to provide sintered electrodes for alkaline storage batteries wherein the porous carrier body in which the active electrode material is distributed firmly adheres to the metal supporting member.

With the above objects in view the present invention mainly comprises in a proces of preparing sintered electrodes for alkaline storage batteries, the steps of forming on the surface of a metal reinforcing member, serving as reinforcement for a porous carrier body in which the active electrode material is distributed, a roughened surface of material electrochemically non-reactive with the alkaline electrolyte; and forming on the thus roughened surface of said metal reinforcing member said porous carrier body which firmly adheres to said metal reinforcing member due to the roughness of the surface thereof.

The metal reinforcing member which supports the porous carrier body in which the active electrode material is distributed is generally perforated and may either be a wire gauze or a plate having perforations therein. The porous carrier body may be formed on the surface of this metal reinforcing member by applying the same in the form of a metal paste or powder and then sintering said paste or powder to the metal reinforcing member, the sintering causing the particles of the porous carrier body material to adhere to each other and to the metal reinforcing member.

The sintering is preferably carried out in a reducing or inert atmosphere. The formed sintered porous carrier body firmly adheres to the metal reinforcing member and because it is porous, it can hold a large amount of active electrode material. The firm adherence of the porous carrier body to the metal reinforcing member of the electrode plate can only be accomplished by first roughening the surface of the electrode plate.

The thus formed porous plate consisting of the metal reinforcing member and the porous carrier body sintered thereto is then impregnated with the active electrode material so as to distribute the same in the porous carrier body. This is accomplished generally by soaking the plate in a solution of nickel or cadmium salts, cathodically polarizing the soaked plates in an alkali solution and washing and drying the same. The usefulness of the electrode plates depends on the ability to retain the active electrode material within the pores of the porous carrier body, and, of course, on the firm adherence of the porous carrier body to the metal reinforcing member.

Generally, the metal reinforcing member is made of a material which is electrochemically reactive with the alkaline electrolyte. It is therefore necessary to first form a surface of material electrochemically nonreactive with the alkaline electrolyte and to roughen this surface before sintering the porous carrier body thereto. This may be done, for example, by plating the metal reinforcing member with an electrochemically non-reactive material such as nickel or chromium and then roughening the thus plated metal reinforcing member.

If the metal reinforcing member of the electrode plate is made entirely of material which is non-reactive with the alkaline electrolyte, i. e., entirely out of nickel or chromium, then the surface of the metal reinforcing member may be roughened without any pre-treatment to form an electrochemically non-reactive surface. However, this is generally more expensive and it is therefore preferable to use as the reinforcing member a material which is electrochemically reactive with the alkaline electrolyte, i. e., iron, and to plate the iron either electrically or chemically or by casting with a substance such as nickel or chromium.

Attempts have been made to form the electrode according to the present invention by roughening the surface of an iron reinforcing member and then plating the same with an electrochemically non-reactive material such as chromium. However, this was found to give poor results because the subsequent plating of the iron reinforcing member had the effect of smoothening the surface of the same to such extent that the later sintered porous carrier body could not properly adhere thereto.

It is therefore necessary, according to the present invention, to first form the surface of material electrochemically non-reactive material with the alkaline electrolyte on the metal supporting member which is electrochemically reactive with the alkaline electrolyte and to roughen this surface before sintering thereto the porous carrier body in which the active electrode material is distributed.

The surface of the metal reinforcing member which has first been made electrochemically non-reactive with the alkaline electrolyte may be roughened in any suitable manner. The roughening of the surface may be accomplished mechanically, although this is preferred mainly in the case of using a metal reinforcing member made entirely of electrochemically non-reactive material so that the mechanical roughening will not cause any electrochemically active portions of the electrode plate to become exposed.

Other methods of roughening the surface may also be used. It is possible to sinter a metallic powder of electrochemically non-reactive material to the surface of the metal reinforcing member, the sintered powder forming a roughened surface on the metal reinforcing member to which the porous carrier body may be later sintered and thereby caused to firmly adhere to the reinforcing member. The active electrode material is then distributed in the porous carrier body.

It is for example possible to powder or dust onto the metal reinforcing member a thin layer of nickel, nickel-copper, or nickel-iron powder and to sinter the same thereon by heating at a temperature of 600–900° C. in a reducing atmosphere. The metallic powder may or may not be of the same material as the porous carrier body for the active electrode material.

Another means of roughening the surface of the metal reinforcing member of the electrode plate comprises spraying the same with a powdered metallic layer, for example, by means of a spray gun for the metal powder.

According to a preferred embodiment of the present invention, the roughened surface is formed on the metal reinforcing member by first heating the same having a surface of material electrochemically non-reactive with the alkaline electrolyte in an oxidizing atmosphere of air or oxygen so as to oxidize the surface thereof. The thus oxidized metal reinforcing member is then heated in a reducing atmosphere so as to reduce the formed oxide to the original form. The oxidation and the subsequent reduction has the effect of roughening the surface of the metal reinforcing member while still maintaining the composition of the same electrochemically non-reactive with the alkaline electrolyte so that upon sintering the porous carrier body thereto, the same firmly adheres to the metal reinforcing member.

The active electrode material may be cadmium, iron or cadmium-iron for the negative electrodes and nickel hydroxide for the positive electrodes. It is to be understood that the present invention is not meant to be limited to any particular active electrode material, the invention being applicable to all of the customary types of active electrode material.

Figure 2A:
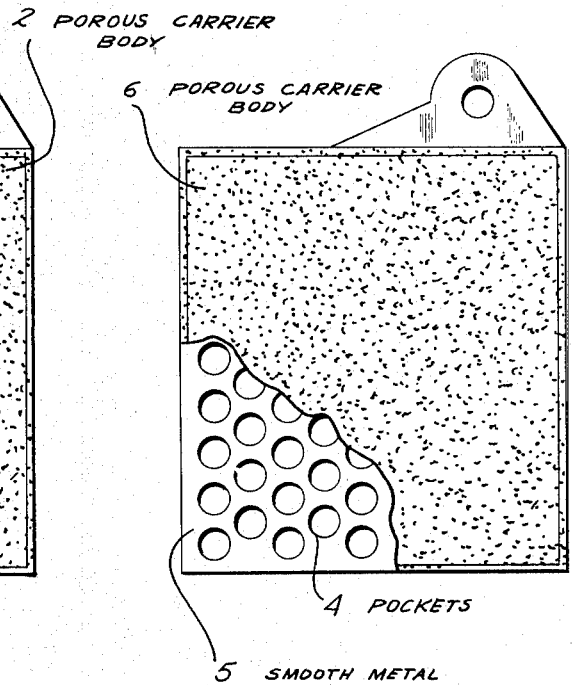
Figure 1B:
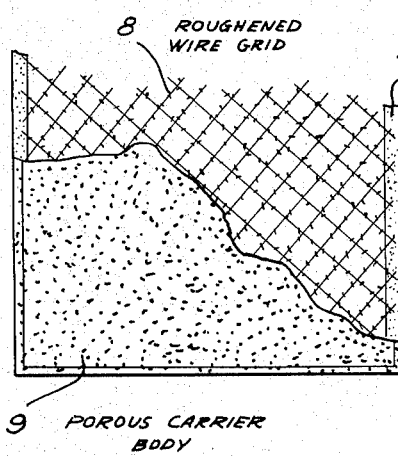
Figure 2B:
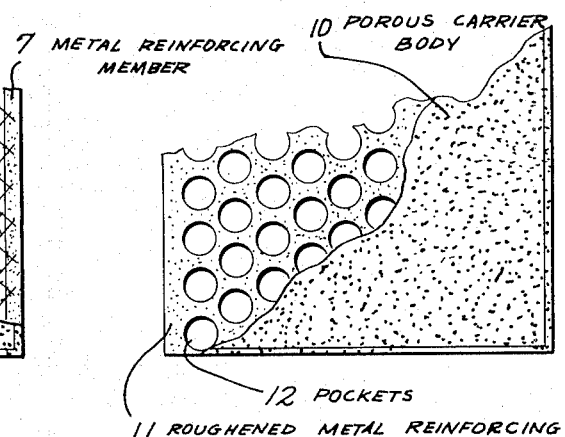

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which Fig. 1a is a front elevational view partly in section of an electrode plate having the porous carrier body sintered to the non-roughened surface of the wire mesh metal reinforcing member;

Fig. 1b is a front elevational view partly in section of the same type of electrode plate as in Fig. 1a wherein the porous carrier body is sintered to the previously roughened surface of the wire mesh metal reinforcing member;

Fig. 2a is a front elevational view partly in section of another electrode plate having the porous carrier body sintered to the non-roughened surface of another type of metal reinforcing member; and Fig. 2b is a front elevational view partly in section of the same type of electrode plate as in Fig. 2a having the porous carrier body sintered to a previously roughened surface on the metal reinforcing member.

Referring now to the drawings and more particularly to Fig. 1a, the metal reinforcing member 1 which serves as reinforcement for the porous carrier body 2 having the active electrode material distributed therein is formed with a wire grid work 3. Because of the smooth surface of the metal supporting member the porous sintered carried body does not adhere firmly to the supporting member.

In Fig. 1b is shown a similar electrode wherein the metal reinforcing member 7 which serves as carrier for the porous carrier body 9 is formed of a grid network 8 having a roughened surface. The porous carrier body 9 having the active electrode material distributed therein firmly adheres to the metal supporting member because of the roughened surface of the same.

Fig. 2a shows another type of electrode plate wherein the metal reinforcing member 5 is formed with pockets 4 and the porous carrier body 6 having the active electrode material distributed therein is sintered to the metal supporting member 5. Because of the smoothness of the metal supporting member the porous carrier body does not adhere firmly to the same.

Fig. 2b shows a similar metal reinforcing member 11 as in Fig. 2a, being formed with perforations 12 and having the porous carrier body sintered to the roughened surface of the metal reinforcing member. The prior roughening of the surface of the metal reinforcing member causes the active electrode material to firmly adhere thereto.

It will be understood that each of the elements described above, or two or more together, may also find a useful application in other types of batteries differing from the types described above.

While the invention has been illustrated and described as embodied in electrode plates for alkaline storage batteries, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process of preparing electrodes for alkaline storage batteries, the steps of forming on the surface of a metal reinforcing member, serving as reinforcement for a porous carrier body in which the active electrode material is distributed, a roughened surface of material electrochemically non-reactive with alkaline electrolyte; and sintering to the thus roughened surface of said metal reinforcing member said porous carrier body which firmly adheres to said metal reinforcing member due to the roughness of the surface thereof.

2. In a process of preparing electrodes for alkaline storage batteries, the steps of forming on the surface of a metal reinforcing member, serving as reinforcement for a porous carrier body in which the active electrode material is distributed, a roughened surface of material electrochemically non-reactive with alkaline electrolyte; sintering to the thus roughened surface of said metal reinforcing member said porous carrier body which firmly adheres to said metal reinforcing member due to the roughness of the surface thereof; and distributing said active electrode maerial in said porous carrier body adhering to said metal reinforcing member.

3. In a process of preparing electrodes for alkaline storage batteries, the steps of forming on the surface of a metal reinforcing member, serving as reinforcement for a porous carrier body in which the active electrode material is distributed, a roughened surface of material electrochemically non-reactive with alkaline electrolyte; applying to the thus roughened surface of said metal reinforcing member a paste including the material of said porous carrier body; and sintering said paste to said roughened surface of said metal reinforcing member so as to form on said metal reinforcing member a porous carrier body which firmly adheres to said metal reinforcing member due to the roughness of the surface thereof.

4. In a process of preparing electrodes for alkaline storage batteries, the steps of forming on the surface of a metal reinforcing member, serving as reinforcement for a porous carrier body in which the active electrode material is distributed, a roughened surface of material electrochemically non-reactive with alkaline electrolyte; appling to the thus roughened surface of said metal reinforcing member a powder of the material of said porous carrier body; and sintering said powder to said roughened surface of said metal reinforcing member so as to form on said metal reinforcing member a porous carrier body which firmly adheres to said metal reinforcing member due to the roughness of the surface thereof.

5. In a process of preparing electrodes for alkaline storage batteries, the steps of forming on the surface of a metal reinforcing member, serving as reinforcement for a porous carrier body in which the active electrode material is distributed, a surface of material electrochemically non-reactive with alkaline electrolyte; roughening the thus formed surface of said metal reinforcing member so as to form a roughened surface of material electrochemically non-reactive with alkaline electrolyte; and sintering to the thus roughened surface of said metal reinforcing member said porous carrier body which firmly adheres to said metal reinforcing member due to the roughness of the surface thereof.

6. In a process of preparing electrodes for alkaline storage batteries, the steps of forming on the surface of a metal reinforcing member, serving as reinforcement for a porous carrier body in which the active electrode material is distributed, a surface of material electrochemically non-reactive with alkaline electrolyte; mechanically roughening the thus formed surface of said metal reinforcing member so as to form a roughened surface of material electrochemically non-reactive with alkaline electrolyte; and sintering to the thus roughened surface of said metal reinforcing member said porous carrier body which firmly adheres to said metal reinforcing member due to the roughness of the surface thereof.

7. In a process of preparing electrodes for alkaline storage batteries, the steps of forming on the surface of a perforated metal reinforcing member, serving as reinforcement for a porous carrier body in which the active electrode material is distributed, a roughened surface of material electrochemically non-reactive with alkaline electrolyte; sintering to the thus roughened surface of said perforated metal reinforcing member said porous carrier body which firmly adheres to said perforated metal reinforcing member due to the roughness of the surface thereof; and distributing said active electrode material in said porous carrier body adhering to said perforated metal reinforcing member.

8. In a process of preparing electrodes for alkaline storage batteries, the steps of forming on the surface of a perforated metal reinforcing member, serving as reinforcement for a porous carrier body in which the active electrode material is distributed, a roughened surface of material electrochemically non-reactive with alkaline electrolyte; applying to the thus roughened surface of said perforated metal reinforcing member a powder of the material of said porous carrier body; and sintering said powder to said roughened surface of said perforated metal reinforcing member, so as to form on said perforated metal reinforcing member a porous carrier body which firmly adheres to said perforated metal reinforcing member due to the roughness of the surface thereof.

9. In a process of preparing electrodes for alkaline storage batteries, the steps of forming on the surface of a metal reinforcing member, serving as reinforcement for a porous carrier body in which the active electrode material is distributed, a surface of material electrochemically non-reactive with alkaline electrolyte; applying a powder of a metallic substance electrochemically non-reactive with alkaline electrolyte to the thus formed surface of said metal reinforcing member; sintering said powder to said surface of said metal reinforcing member so as to form a roughened surface of material electrochemically non-reactive with alkaline electrolyte; and sintering on the thus roughened surface of said metal reinforcing member said porous carrier body which firmly adheres to said metal reinforcing member due to the roughness of the surface thereof.

10. In a process of preparing electrodes for alkaline storage batteries, the steps of forming on the surface of a metal reinforcing member, serving as reinforcement for a porous carrier body in which the active electrode material is distributed, a surface of material electrochemically non-reactive with alkaline electrolyte; spraying a powder of a metallic substance electrochemically non-reactive with alkaline electrolyte on the thus formed surface of said metal reinforcing member; sintering said powder to said surface of said metal reinforcing member so as to form a roughened surface of material electrochemically non-reactive with alkaline electrolyte; and sintering on the thus roughened surface of said metal reinforcing member said porous carrier body which firmly adheres to said metal reinforcing member due to the roughness of the surface thereof.

11. In a process of preparing electrodes for alkaline storage batteries, the steps of forming on the surface of a metal reinforcing member, serving as reinforcement for a porous carrier body in which the active electrode material is distributed, a surface of material electrochemically non-reactive with alkaline electrolyte; oxidizing the thus formed surface of said metal reinforcing member, and subsequently reducing the thus oxidized surface of said metal reinforcement member so as to form a roughened surface of material electrochemically non-reactive with alkaline electrolyte on the same; and sintering on the thus roughened surface of said metal reinforcing member said porous carrier body which firmly adheres to said metal reinforcing member due to the roughness of the surface thereof.

12. In a process of preparing electrodes for alkaline storage batteries, the steps of plating the surface of a metal reinforcing member, serving as reinforcement for a porous carrier body in which the active electrode material is distributed, and being electrochemically reactive with alkaline electrolyte, with a material electrochemically non-reactive with alkaline electrolyte so as to form a surface of the same on said metal reinforcing member while avoiding electrochemical reaction between said metal reinforcing member and alkaline electrolyte; roughening the thus formed surface of said metal reinforcing member so as to form a roughened surface of material electrochemically non-reactive with alkaline electrolyte; and sintering on the thus roughened surface of said metal reinforcing member said porous carrier body which firmly adheres to said metal reinforcing member due to the roughness of the surface thereof.

13. In a process of preparing electrodes for alkaline storage batteries, the steps of plating the surface of an iron reinforcing member, serving as reinforcement for a porous carrier body in which the active electrode material is distributed, and being electrochemically reactive with alkaline electrolyte, with a material electrochemically non-reactive with alkaline electrolyte and being selected from the group consisting of nickel and chromium so as to form a surface of the same on said iron reinforcing member while avoiding electrochemical reaction between said iron reinforcing member and alkaline electrolyte; roughening the thus formed surface of said iron reinforcing member so as to form a roughened surface of material electrochemically non-reactive with alkaline electrolyte; and sintering on the thus roughened surface of said iron reinforcing member said porous carrier body which firmly adheres to said iron reinforcing member due to the roughness of the surface thereof.

14. In a process of preparing positive electrodes for alkaline storage batteries, the steps of plating the surface of an iron reinforcing member, serving as reinforcement for a porous carrier body in which nickel hydroxide as active electrode material is distributed, and being electrochemically reactive with alkaline electrolyte, with a material electrochemically non-reactive with alkaline electrolyte and being selected from the group consisting of nickel and chromium, so as to form a surface of the same on said iron reinforcing member while avoiding electrochemical reaction between said iron reinforcing member and alkaline electrolyte; roughening the thus formed surface of said iron reinforcing member so as to form a roughened surface of material electrochemically non-reactive with alkaline electrolyte; and sintering on the thus roughened surface of said iron reinforcing member said porous carrier body which firmly adheres to said iron reinforcing member due to the roughness of the surface thereof.

15. In a process of preparing negative electrodes for alkaline storage batteries, the steps of plating the surface of an iron reinforcing member, serving as reinforcement for a porous carrier body in which the active electrode material selected from the group consisting of iron, cadmium, oxides of iron, oxides of cadmium and mixtures thereof is distributed, and being electrochemically reactive with alkaline electrolyte, with a material electrochemically non-reactive with alkaline electrolyte and being selected from the group consisting of nickel and chromium, so as to form a surface of the same on said iron reinforcing member while avoiding electrochemical reaction between said iron reinforcing member and alkaline electrolyte, roughening the thus formed surface of said iron reinforcing member so as to form a roughened surface of material electrochemically non-reactive with alkaline electrolyte; and sintering on the thus roughened surface of said iron reinforcing member said porous carrier body which firmly adheres to said iron reinforcing member due to the roughness of the surface thereof.

16. Electrode for alkaline storage batteries, comprising, in combination, a metal reinforcing member serving as reinforcement for a porous carrier body in which the active electrode material is distributed, and having a roughened surface of material electrochemically non-reactive with alkaline electrolyte; and a porous carrier body, in which said active electrode material is distributed, firmly adhering to said roughened surface of said metal reinforcing member due to the roughness of the same.

17. Electrode for alkaline storage batteries, comprising, in combination, a metal reinforcing member serving as reinforcement for a porous carrier body in which the active electrode material is distributed, and having a roughened surface of material electrochemically non-reactive with alkaline electrolyte; and a sintered porous carrier body in which said active electrode material is distributed, firmly adhering to said roughened surface of said metal reinforcing member due to the roughness of the same.

References Cited in the file of this patent

UNITED STATES PATENTS

| | | |
|---|---|---|
| 1,955,115 | Drumm | Apr. 17, 1934 |
| 2,251,913 | Brennan | Aug. 12, 1941 |
| 2,361,378 | Brennan | Oct. 31, 1944 |
| 2,696,515 | Koren et al. | Dec. 7, 1954 |

FOREIGN PATENTS

| | | |
|---|---|---|
| 653,235 | Great Britain | May 9, 1951 |